(12) United States Patent
Bollay

(10) Patent No.: US 6,457,009 B1
(45) Date of Patent: Sep. 24, 2002

(54) METHOD OF SEARCHING MULTIPLES INTERNET RESIDENT DATABASES USING SEARCH FIELDS IN A GENERIC FORM

(76) Inventor: Denison W. Bollay, 203 Chapala St., Santa Barbara, CA (US) 93101

( * ) Notice: Subject to any disclaimer, the term of this patent is extended or adjusted under 35 U.S.C. 154(b) by 0 days.

(21) Appl. No.: 09/189,058

(22) Filed: Nov. 9, 1998

(51) Int. Cl.⁷ .............................................. G06F 17/30
(52) U.S. Cl. ............................. 707/10; 707/4; 707/5; 707/501.1
(58) Field of Search ...................... 707/4, 5, 10, 501.1, 707/3

(56) References Cited

U.S. PATENT DOCUMENTS

| | | | | |
|---|---|---|---|---|
| 5,848,424 A | * | 12/1998 | Scheinkman et al. | 707/501 |
| 5,859,972 A | * | 1/1999 | Subramaniam et al. | 395/200.33 |
| 5,884,309 A | * | 3/1999 | Vanechanos, Jr. | 707/10 |
| 5,890,172 A | * | 3/1999 | Borman et al. | 707/501 |
| 5,905,862 A | * | 5/1999 | Hoekstra | 395/200.32 |
| 5,987,454 A | * | 11/1999 | Hobbs | 707/4 |
| 5,995,961 A | * | 11/1999 | Levy et al. | 707/4 |
| 6,102,969 A | * | 8/2000 | Christianson et al. | 717/8 |

OTHER PUBLICATIONS

Brown, Mark "Special Edition: Using Netscape 2", Que, 1995 p. 267–270.*

Adali, S; Bufi, C.; A Flexible Architecture for query intergration and mapping Cooperative Information Systems, 998. Proceedings. 3rd IFCIS International Conference on , 1998 pp.: 341–351.*

Adali, S; Bufi, C; Temtanapat y. "Intergrated Search Engine" Knowledge and Data Engineering Exchange Workshop, 1997. proceedings, 1997. pp. 140–147.*

* cited by examiner

Primary Examiner—John Breene
Assistant Examiner—Khanh Pham
(74) Attorney, Agent, or Firm—Owen L. Lamb

(57) ABSTRACT

A method of enabling multiple and different remote Internet resident databases to be queried by using search fields in a generic form in a browser by entering field information only once. The multiple searchable remote databases use specific search fields that are maintained in a master meta database of databases. The database includes translations from a uniform field name to an actual name used by a corresponding remote database. The translations are utilized by local browser software to populate a specific HTML search form peculiar to a given remote database. Each specific search form is then associated with unique indicia, a picture or company logo also found in the database. The indicia are then arranged on screen such that multiple database queries from the generic form can be initiated by clicking on the corresponding indicia. Results returned from a query are then displayed on screen in a target window. Another query can be made by clicking on different indicia, without reentering information into the generic search form. A macro generator creates the necessary JavaScript and HTML INPUTS to build each specific search form contemporaneously with clicking on one of the unique indicia.

23 Claims, 4 Drawing Sheets

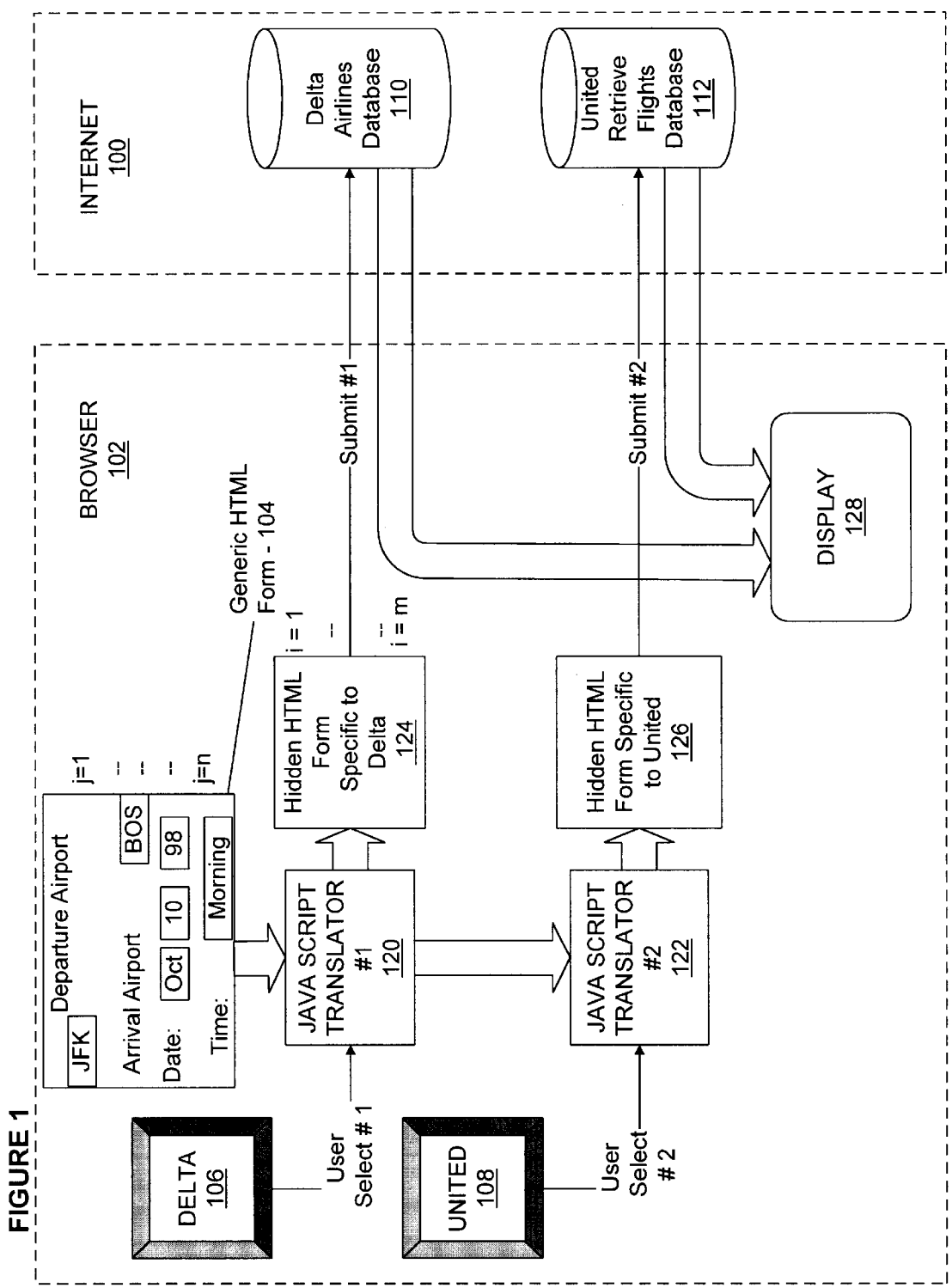

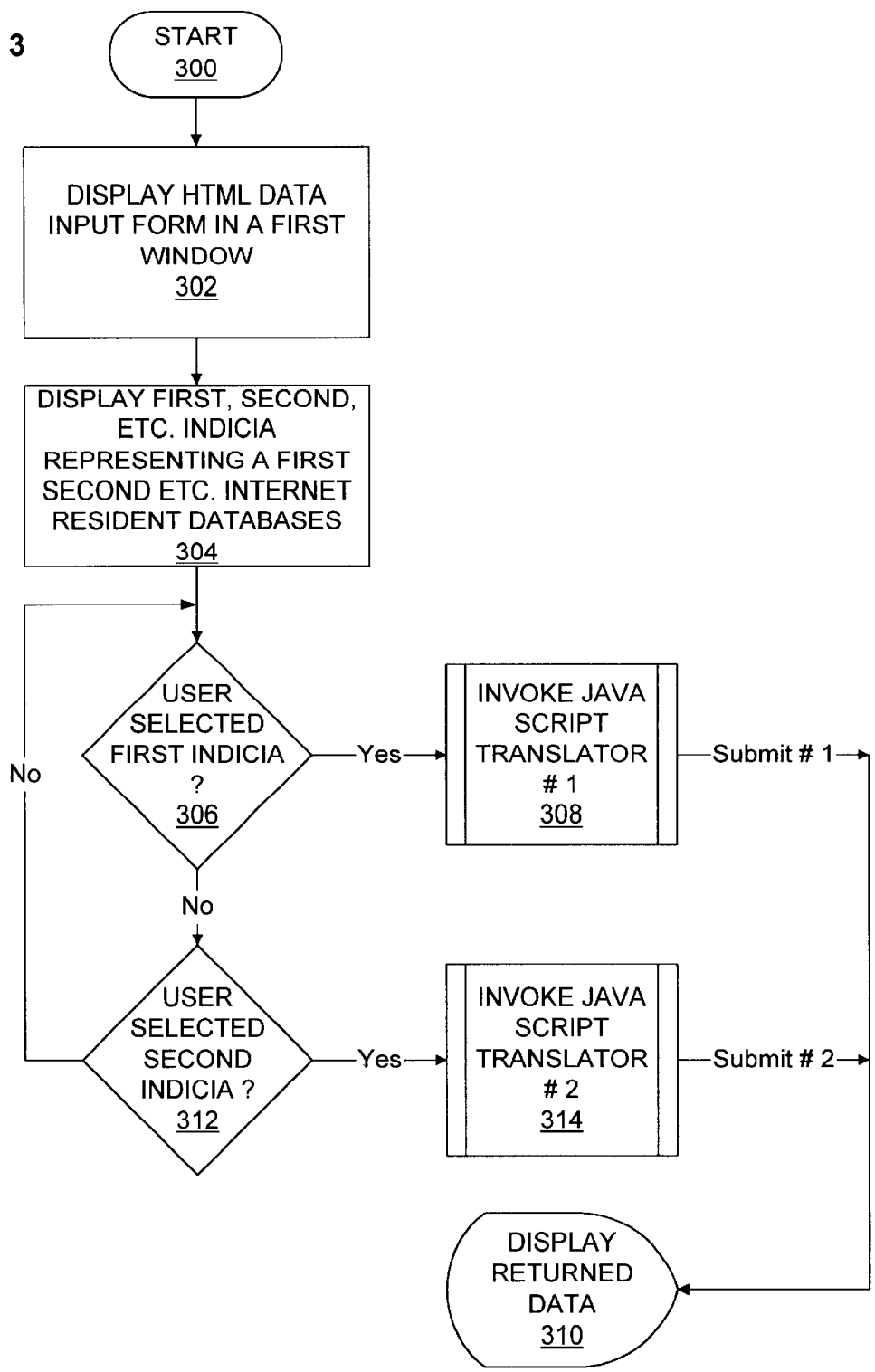

METHOD OF SEARCHING MULTIPLES INTERNET RESIDENT DATABASES USING SEARCH FIELDS IN A GENERIC FORM

BACKGROUND OF THE INVENTION

1. Field of the Invention

This invention relates to database searching and more particularly, to a method of querying multiple Internet resident databases from a browser.

2. Description of the Prior Art

Hypertext documents are electronic documents that are typically arranged on a computer screen as text, graphic images and sound. Using a pointing device, such as a mouse, a user can choose a related screen to go to next by selecting an option with the mouse. HTML (Hypertext Markup Language) is a set of codes that are placed in text files to indicate meaning, insert images, and create links to other documents. HTML is used to publish information on the Internet that may be accessed and displayed by an Internet browser. An Internet browser is a computer program that displays hypertext on the Internet.

A Search Engine is a software program that indexes web pages so that searches may be performed using key words. A portal is a web site that has entry points to many useful places in the web.

Content: Most portals and search engines go for very broad content from "Asian Culture" to "Wedding Gowns". Database sites have no special significance over other sites, and no information is stored specifically for database sites.

Data Types: Most portals and search engines only cover the text on web pages. Altavista™ has licensed a special purpose image categorization engine from Virage™. WebData™ is designed to handle databases on the web. Many portals do have a few often used database queries for stock info, name lookup, etc.

Categorization: Some portals organize sites into one or more categories, usually hierachically. Often this requires human interaction. Traditionally search engines did not try to fit sites into categories, but let the indexing of words sift out the sites of interest individually for each search.

Keyword Search: All portals and search engines have keyword search ability. Engines like AltaVista™ use keywords to lookup in their page indexes which sites contain the words. Yahoo! looks up keywords in category names, and site descriptions (not the full text of the site).

NetCenter™ lets users choose which search engine to use with a pop up menu (Javascript powered, browser side), as do several other portals. (Once you choose a search engine and click, you leave the site).

Starting-Point™ does a variation on this theme by returning a new (server generated) page of keyword lookups in different search engines that the user may then choose from. From their recently introduced 'PowerSearch Assistant', one can change the keywords and search engine.

DogPile™ allows users to enter a keyword once from a browser, and a server side script sends the keywords to multiple search engines, and sends all the results back to the user.

Goto.com™ looks up keywords in a list of paid advertisers first, and then after that provides general search engine results through a contract with Inktomi.

AltaVista™ has a facility to answer questions (from Ask Jeeves).

The WebData™ search engine (www.webdata.com) maintained by ExperTelligence, Inc. lists database categories. One chooses an appropriate category to begin a search for a relevant web site. To get flight information, one would select Travel and Lodging. Choosing Travel and Lodging results in a list of titles: Airlines, Cruises, etc. Choosing Airlines brings up a page listing a number of web sites of airline databases that can be accessed for flight information, for example Delta Air Lines-schedules. Choosing any one of the many titles from the list brings up a form used to query the database chosen. This is accomplished by maintaining a database of databases in a server at the WebData™ site. The WebData™ database stores HTML query forms for different databases that can be accessed, and displays the appropriate form on screen when a user selects an item in a subcategory. Database forms, even in the same category, tend to use different field names for each field of the form. To get flight information for each airline, one would have to select the airline's query form from the list and fill out the form for that airline. Each subsequent airline to be queried requires re-entering the information into the form for that airline. The problem is that all forms are different and with present technology need to be filled in separately in order to submit a query.

It is desirable to have a way to view multiple possible responses to a given kind of query submitted to a number of different databases.

What is also needed is a way to build a specific HTML form from a database of translations that translate from a "Uniform Field Name" to the actual name or field code used by a specific database.

It is desirable to be able to generate each separate HTML form and to automatically rebuild multiple forms given a generic form so that multiple queries can be made from filling out just the one generic form.

Once the specific HTML forms have been generated, it is desirable to be able to arrange the elements on screen such that multiple queries to different databases can be made from one generic form, without having to re-enter the information into the different forms for each database.

SUMMARY OF THE INVENTION

Briefly, the invention is concerned with a method of enabling multiple and different remote Internet resident databases to be queried by using search fields filled in once in a generic HTML form. Specific search fields used to query multiple searchable remote databases are stored on the server in a database of databases. Translations from uniform field names to actual names used by a corresponding remote database search field are stored in a database on the server. Unique field indicia for the corresponding remote database are also stored in the database. Local browser software populates a specific search form peculiar to a given remote database by utilizing the translations as embodied in JavaScript code. A specific search form is associated with one of the unique FORM indicia, such that multiple remote databases are matched one-for-one with multiple unique indicia. The FORM indicia are arranged on screen such that multiple database queries from the generic form can be initiated by selecting corresponding indicia.

In accordance with an aspect of the invention, results returned from a query are displayed on screen in a target window.

In accordance with another aspect of the invention, a server-side macro generator creates JavaScript needed to submit a remote query including a specific search form contemporaneously with the selecting one of the unique indicia.

The generic HTML data input form is displayed in a first window of the Internet browser. On the browser, first indicia representing a first database and second indicia representing a second database of a number of Internet resident databases are displayed. At the browser, search data entered in the generic HTML data input form is translated into a first HTML FORM compatible with the first Internet resident database in response to a user having selected the first indicia. The first database is searched with the data entered into the generic FORM. In a second window (pane,frame) of the browser, first data returned from the first database as a result of searching the first database is displayed. At the browser, the search data entered in the generic HTML data input form is translated into a second HTML FORM compatible with the second internet resident database in response to a user having selected the second indicia. The second database is searched with the same data entered into the generic FORM. Second data returned from the second database as a result of searching the second database is displayed.

The invention has the advantage that it enables many databases to be accessed from a browser using just one standard input form that is valid across many related databases.

BRIEF DESCRIPTION OF THE DRAWINGS

The invention will be described in greater detail with reference to the drawings in which:

FIG. 1 is an overall block diagram of a browser in which the present invention is embodied;

DETAILED DESCRIPTION OF THE INVENTION

Figure 2A:
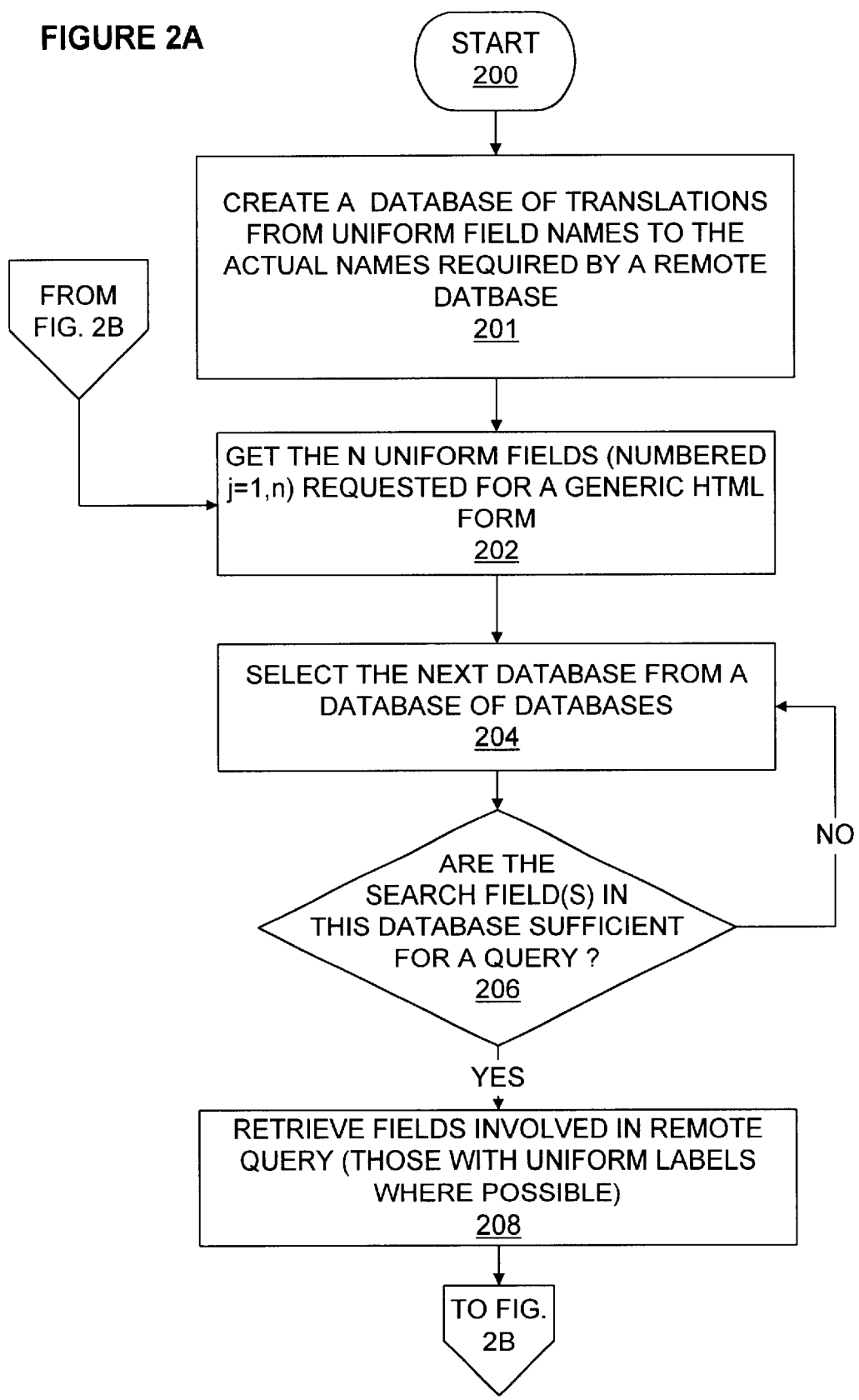
FIGS. 2A and 2B comprises a flow diagram of a meta search form generator (macro generator) for producing forms utilized in the query of selected databases; and, FIG. 3 is a flow diagram of computer software for implementing the invention shown in FIG. 1 and FIGS. 2A and 2B on a browser.

Refer to FIG. 1 that is an overall block diagram of a browser 102 in which the present invention is embodied. The browser is capable of searching databases 110, 112 on the Internet 100. For example, the database 110 is a Delta Airlines Database and the database 112 is a United Retrieve Flights Database of United Airlines. A generic HTML form 104 is displayed on the browser along with a number of images, shown as buttons 106, 108 representing in graphical form the databases 110, 112, existing on the Internet 100. In practice, buttons 106, 108, might be pictures such as the company logo for Delta and United, respectively. A user begins a search by first filling in the form fields j=1,n with selections for departure airport, arrival airport, date and time, and then selecting one of the screen images 106, 108, for Delta or United, respectively. The selected image causes a corresponding user select #1 or user select #2 event. The user select invokes a corresponding JavaScript translator 120, or 122 that translates the input codes of the generic HTML form into a specific HTML form 124, or 126, (hidden from the user) specific to the database selected and submits the hidden HTML form to the remote database. The generic form is rendered transparent to the selected database by the JavaScript code, since the HTML form specific to that database is what is submitted over the Internet. The database returns data in its normal mode and the data is displayed visibly to the user in a target window on display 128. The display 128 preferably continues to display the generic HTML form and the select buttons 106, 108 in one window, while displaying the returned database data in a second target window. If the user wishes to view data from another database, the user clicks on another one of the buttons, 106, 108, which causes data to be returned from the corresponding database which replaces the data in the second window, or alternatively, opens a third window. Only two buttons are illustrated, however, those skilled in the art will realize that many such buttons may be displayed, or a pull-down may be substituted for buttons.

Macro Generator Software to Generate HTML Forms Automatically

A database is created that contains translations from a "uniform field name" to the actual name used by a remote database. As shown in FIG. 1 there are n fields (J=1, n) in the generic form (visible to user). In this example, the generic form has six fields, shown in TABLE I.

TABLE I

| VALUE OF j | UNIFORM FIELD NAME |
|---|---|
| 1 | Departure |
| 2 | Arrival |
| 3 | Month |
| 4 | Day |
| 5 | Year |
| 6 | Hours |

In the actual specific HTML form (hidden from user) used to access http://www.delta-air.com there are m fields (=1,m). m is equal to or greater than n. For Delta Airline the translations stored in the database are shown in Table II Nine actual field names are required by the Delta Airline remote query. Since the generic form uses six fields, only six fields need to be mapped onto the specific HTML form to be submitted. Two fields (Day and Year) map to the same field. The unmapped fields are filled with an input (not supplied by the user) to satisfy the Delta Airlines database.

TABLE II

| VALUE OF i | ACTUAL NAME (REQUIRED BY REMOTE DATABASE) | UNIFORM FIELD NAME | VALUE OF j |
|---|---|---|---|
| 1 | DptText | Departure | 1 |
| 2 | ArrText | Arrival | 2 |
| 3 | Departure | — | — |
| 4 | Arrival | — | — |
| 5 | MaxFights | — | — |
| 6 | LimitChoice | — | — |
| 7 | TimeOfDay | Hours | 6 |
| 8 | Month | Month, Year | 3, 5 |
| 9 | Day | Day | 4 |

Figure 2B:
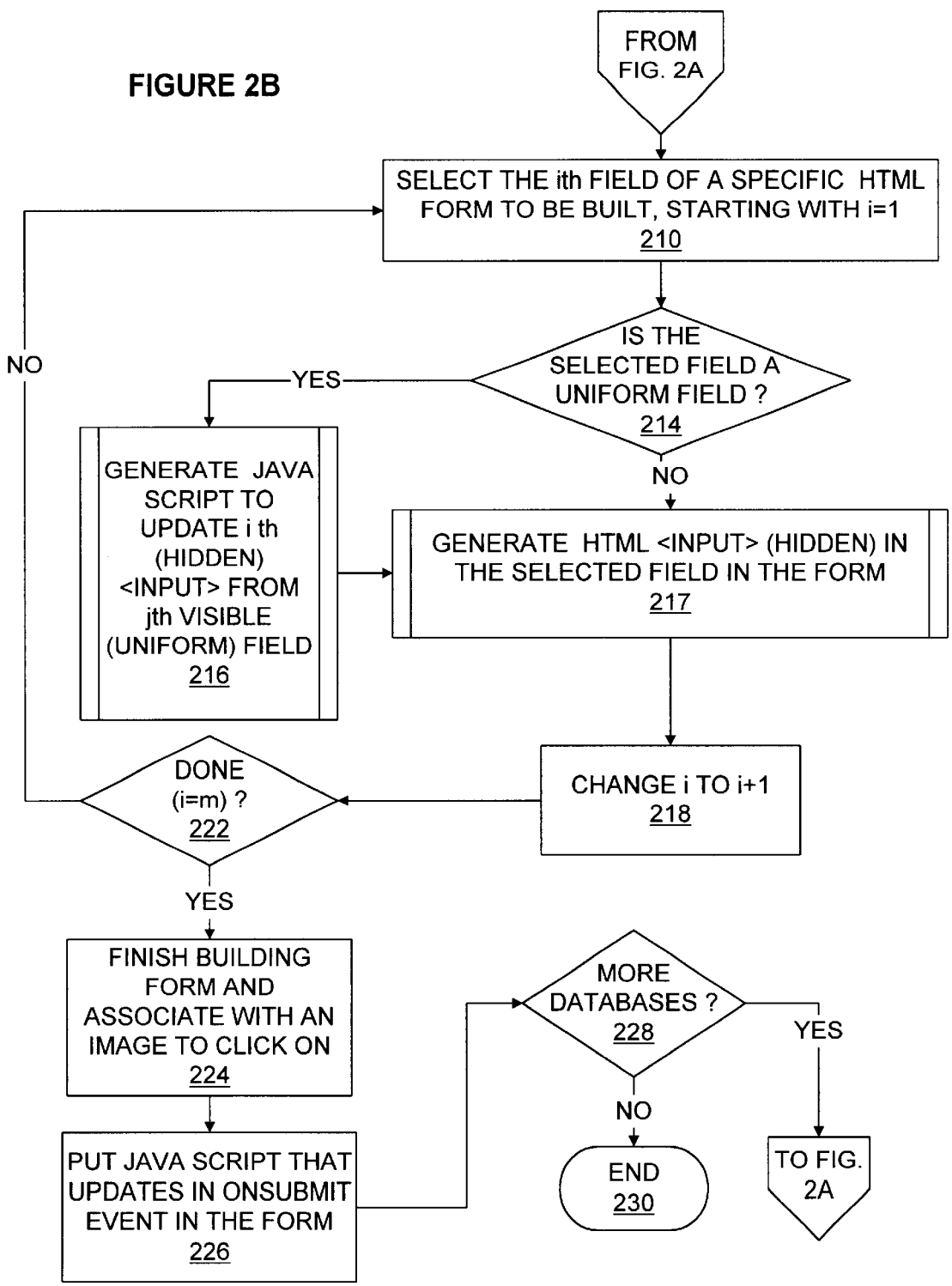

In order to automatically fill out the Delta Airlines form from the data entered into the generic form by the user, a JavaScript is utilized. Refer to FIGS. 2A and 2B which comprise a flow diagram of a meta search form generator (macro generator) for run-time generation of the specific HTML forms utilized in the query of selected remote databases. First, at database is created that contains translations from a "uniform field name" to the actual name used by a remote database. The fields of this generic form are numbered from j=1 to j=n. The software gets the n uniform fields requested for this generic HTML form 202. Next, a database is selected from a database of databases 204. A decision is made 206, matching the uniform fields in the generic FORM with the database's uniform fields to ascertain the search fields in this database are sufficient for a query. If not, the next database is selected. If yes, the fields involved in a remote query of the selected database are retrieved 208. Retrieved from the database are a number (m) of fields involved in the remote query. The program now starts to build an HTML form by parsing the condition that the $i^{th}$ field is a uniform field, a yes path is taken from the decision 214. JavaScript is generated 216 to update the $i^{th}$ input from a $j^{th}$ generic field of the generic HTML form. Upon a condition that the $it^{th}$ field is not a uniform field, a no path is taken from the decision 214 and a hidden HTML input is generated 217 in the form for the $i^{th}$ field. i is changed to i+1 to select a next field of the number of fields. Steps 214–220 are repeated until the number of fields are depleted (i=m) at decision 222. The HTML form is associated with a unique screen image to select (click on) 224 and the JavaScript that updates values in the newly constructed FORM during an "onsubmit" event is put in the form 226. The process is repeated 228 for more databases. If there are no more databases, the process ends 230.

It will be understood by those skilled in the art that a blank, or partially blank, FORM may be displayed; that is, a form that does not set forth field names of the fields that a user must fill in. This will establish a search field made up of a number (n) of uniform fields sufficient for a remote query of a database. In FIG. 1, the generic HTML form 104 supplies the uniform fields "departure airport", Arrival Airport", "Date" and "Time" which the user fills in. With this alternative, a user can choose the uniform fields, for example, "Last Name", "City" and "State", and the macro generator described above will retrieve from a database, a number (m) of fields involved in the remote query. It will find all the databases that can be queried by filing in the fields "Last Name", "City" and "State". The user then fills in the form. This provides a database search where the user sets forth the field names for form fields that must be filled in for a search. This is in contrast to database searches where the form sets forth the field names for fields that a user must fill in.

Browser Software

Refer to FIG. 3 which comprises a flow diagram of computer software 300 for implementing the invention shown in FIG. 1 and FIGS. 2A and 2B on a browser. The software displays 302 an HTML data input form in a first window of an Internet browser. Next, on the browser, first indicia representing a first database and second indicia representing a second database of a number of Internet resident databases are displayed 304. By way of example, the first indicia may be a logo for Delta Airlines and the second indicia may be a logo for United. Many indicia may be displayed corresponding to many databases, but for clarity only two are shown.

The user fills out the generic HTML data input form and selects 306 the desired airline by clicking on the appropriate logo, for example the first indicia. At the browser, the search data entered in the generic HTML data input form is translated into a first search FORM compatible with the first internet resident database in response to the user having selected the first indicia. That is, the software invokes 308 the JavaScript translator #1 that translates the generic form into a specific HTML form specific to the database being queried. The first database is searched with the data from the generic FORM. First data returned from the first database as a result of searching the first database is displayed 310 in a second target window of the browser.

Without having to fill out the generic HTML data input form again, the user can select another desired airline by clicking on the appropriate logo, for example the second indicia 312. At the browser, the search data entered in the generic HTML data input form is translated into a second search FORM compatible with the second internet resident database in response to the user having selected the second indicia. That is, the software invokes 314 the JavaScript translator # 2 that translates the generic form into a second HTML form specific to the second database being queried. The second database is searched with the second search FORM. Second data returned from the second database as a result of searching the second database are displayed 310 in the second window or a third of the browser.

Code for Generic HTML Form

```
<FORM NAME="AirForm" ONSUBMIT="return false;">

<SELECT NAME="Departure" ONCHANGE=
   "depAirportCh(this);" SIZE="1">
<OPTION VALUE="AUS">Austin, Tex.
<OPTION VALUE="BFL">Bakersfield, Calif.
...
   <OPTION VALUE="ZRH">Zurich, Switzerland
</SELECT>

<SELECT NAME="Arrival" ONCHANGE=
   "arrAirportChg(this);" SIZE="1">
<OPTION VALUE="AUS">Austin, Tex.
<OPTION VALUE="BFL">Bakersfield, Calif.
...
<OPTION VALUE="ZRH">Zurich, Switzerland
</SELECT>

SELECT NAME="Month" ONCHANGE="updateDate(
   );">
<OPTION VALUE="1">Jan.
...
<OPTION VALUE="12">Dec.
</SELECT>

<SELECT NAME="Day" ONCHANGE="updateDate( );">
<OPTION value=1 SELECTED>1

...
<OPTION value="31">31
</SELECT>

<SELECT NAME="Year" ONCHANGE="updateDate(
   );">
<OPTION VALUE="1998" SELECTED>98
<OPTION VALUE="1999">99
</SELECT>

<SELECT NAME="Hours" ONCHANGE="updateDate(
   );">
<OPTION VALUE="7" SELECTED>Morning
<OPTION VALUE="12">Noontime
<OPTION VALUE="20">Evening
</SELECT>

</FORM>
```
Code for Specific HTML Form
```
<FORM METHOD="POST" ACTION="http://www.delta-
   air.com/cgi-bin/wwwvhost.cgi"
   target="ChoiceView"
ONSUBMIT="this.DptText.value=
   AirForm.DepCode.value;
this.ArrText.value=AirForm.ArrCode.value;
```

```
if (depdate.getHours( )==0)
    this.TimeOfDay.value='12m';
else if (depdate.getHours( )<12)
    this.TimeOfDay.value=depdate.getHours( ).toString(
        )+'A';
else if (depdate.getHours( )==12)
    this.TimeOfDay.value='12n';
else if (depdate.getHours( )>12)
    this.TimeOfDay.value=(depdate.getHours( )-12)
        .toString( )+'P';
this.Month.value=depdate.getyear( )+':'+monthName
    (depdate.getMonth( )+1);
this.Day.value=depdate.getDate( );">

<INPUT TYPE=HIDDEN NAME="DptText">
<INPUT TYPE=HIDDEN NAME="ArrText">
<INPUT TYPE=HIDDEN NAME="Departure">
<INPUT TYPE=HIDDEN NAME="Arrival">
<INPUT TYPE=HIDDEN NAME="MaxFlights" VALUE=
    "20">
<INPUT TYPE=HIDDEN NAME="LimitChoice"
    VALUE="2">
<INPUT TYPE=HIDDEN NAME="TimeOfDay">
<INPUT TYPE=HIDDEN NAME="Month">
<INPUT TYPE=HIDDEN NAME="Day">
<INPUT TYPE="image" SRC="../ads/delta.gif">
</FORM>
```

While the invention has been particularly shown and described with reference to preferred embodiments thereof it will be understood by those skilled in the art that the foregoing and other changes in form and detail may be made therein without departing from the scope of the invention.

What is claimed is:

1. A method of enabling multiple remote Internet resident databases within a category of databases to be queried from a browser by using one or more search fields of one generic form, a search field of said generic form having a uniform field name, said method comprising:
    A. storing, in a database of databases, at least one specific search field used to query a remote database from within said category of multiple searchable remote databases;
    B. creating translations from each uniform field name of said generic form to actual names of specific search fields used by said remote database and a unique indicia corresponding to said remote database;
    C. repeating step A and step B for each remote database within said category of multiple searchable remote databases, resulting in a number of unique indicia, one unique indicia for each database in said category, multiple remote databases being associated one-for-one with multiple unique indicia;
    D. arranging said generic form for said category and said number of unique indicia on said browser in response to a selection by a user of said category of multiple searchable remote databases; and,
    E. utilizing software at said browser to populate said specific search fields of said remote database in response to a selection by said user of said unique indicia corresponding to said remote database.

2. The method of claim 1 further comprising:
    F. displaying results returned from a query on screen in a target window.

3. The method of claim 1 wherein a macro generator creates JavaScript and an HTML FORM needed to generate a remote query, including a specific search form, contemporaneously with selecting one of said unique indicia.

4. The method of claim 2 wherein a macro generator creates JavaScript and an HTML form needed to generate a remote query including a specific search form contemporaneously with selecting one of said unique indicia.

5. A method comprising:
    A. establishing a generic HTML form made up of a number (n) of uniform fields sufficient for a query of a remote database;
    B. retrieving from a database, a number (m) of fields involved in a query of said remote database;
    C. building a specific HTML form by
        selecting the $i^{th}$ field of said retrieved number (m) of fields,
        upon a condition that said $i^{th}$ field is a uniform field, generating JavaScript to update said $i^{th}$ input from a $j^{th}$ generic field of said generic HTML form,
        upon a condition that said $i^{th}$ field is not a uniform field, generating a hidden HTML input in said specific HTML form for said $i^{th}$ field; and,
    D. changing i to i+1 to select a next field of said retrieved number of fields.

6. The method in accordance with claim 5 in which in step A at least one of said number (n) of uniform fields is left blank to be filled in by a user.

7. The method of claim 5 further comprising:
    E. repeating steps C and D until said number of fields are depleted.

8. The method of claim 5 further comprising:
    E. asssociating said specific HTML form with a unique indicia.

9. The method of claim 6 further comprising:
    E. associating said specific HTML form with a unique indicia.

10. The method of claim 7 further comprising:
    E. associating said specific HTML form with a unique indicia.

11. A method of searching Internet resident databases comprising:
    A. displaying a generic HTML data input form in a first window of an Internet browser;
    B. displaying, on said browser, first indicia representing a first database and second indicia representing a second database of a number of Internet resident databases;
    C. at said browser, translating search data entered in said generic HTML data input form into a first search FORM compatible with said first internet resident database in response to a user having selected said first indicia;
    D. initiating a search of said first database with said first search FORM;
    E. at said browser, displaying first data returned from said first database as a result of a search of said first database
    F. at said browser, translating said search data entered in said generic HTML data input form into a second search FORM compatible with said second internet resident database in response to a user having selected said second indicia;
    G. initiating a search of said second database with said second search FORM, and;
    H. at said browser, displaying second data returned from said second database as a result of a search of said second database.

12. The method of claim 11 wherein said step E displays said first data in a second window of said browser.

13. The method of claim 11 wherein said step H displays said second data in a third window of said browser.

14. The method of claim 11 wherein said step H displays said second data in said second window of said browser.

15. The method of claim 11 wherein said step H replaces said first data in said second window of said browser with said second data.

16. A method comprising:
A. establishing a generic HTML form made up of a number (n) of uniform fields sufficient for a query of a remote database;
B. retrieving from said remote database, a number (m) of fields involved in said query of a remote database;
C. building a specific HTML form by
   selecting the $i^{th}$ field of said retrieved number (m) of fields,
   upon a condition that said $i^{th}$ field is a uniform field, generating JavaScript to update said $i^{th}$ input from a $j^{th}$ generic field of said generic HTML form,
   upon a condition that said $i^{th}$ field is not a uniform field, generating a hidden HTML input in said specific HTML form for said jth field;
D. changing i to i+1 to select a next field of said number of fields;
E. repeating steps C and D until said number of fields are depleted;
F. associating said specific HTML form with a unique indicia;
G. displaying said unique indicia and said generic HTML form in a window of said browser; and,
H. at said browser, submitting said specific HTML form to said remote database in response to a user having selected said unique indicia.

17. The method of claim 16 wherein steps B through F are repeated for a plurality of remote databases, resulting in a specific HTML form and a unique indicia for each remote database in said plurality of remote databases, said step G includes arranging a plurality of said indicia on screen, multiple database queries from said generic HTML form being initiated by selecting corresponding indicia.

18. The method of claim 16 further comprising:
I. in a target window of said browser, displaying data returned from said remote database as a result of searching said remote database.

19. The method of claim 17 further comprising:
I. in a target window of said browser, displaying data returned from one of said plurality of remote database as a result of searching said one of said plurality of remote databases.

20. The method of claim 16 wherein said step H includes creating JavaScript and an HTML form needed to generate a remote query, including a specific search form, contemporaneously with selecting said unique indicia.

21. The method of claim 17 wherein said step H includes creating JavaScript and an HTML form needed to generate a remote query, including a specific search form, contemporaneously with selecting said unique indicia.

22. The method of claim 18 wherein said step H includes creating JavaScript and an HTML form needed to generate a remote query, including a specific search form, contemporaneously with selecting said unique indicia.

23. The method in accordance with claim 16 wherein in step A at least one of said number (n) of uniform fields is left blank to be filled in by a user.

* * * * *